(12) United States Patent
Bicket et al.

(10) Patent No.: US 10,454,984 B2
(45) Date of Patent: *Oct. 22, 2019

(54) METHOD FOR STREAMING PACKET CAPTURES FROM NETWORK ACCESS DEVICES TO A CLOUD SERVER OVER HTTP

(71) Applicant: Cisco Technology, Inc., San Jose, CA (US)

(72) Inventors: John Bicket, San Francisco, CA (US); Benjamin A. Chambers, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 15/607,089

(22) Filed: May 26, 2017

(65) Prior Publication Data

US 2017/0264663 A1  Sep. 14, 2017

Related U.S. Application Data

(63) Continuation of application No. 14/704,417, filed on May 5, 2015, now Pat. No. 9,692,802, which is a
(Continued)

(51) Int. Cl.
*G06F 15/16* (2006.01)
*H04L 29/06* (2006.01)
(Continued)

(52) U.S. Cl.
CPC ............ *H04L 65/602* (2013.01); *H04L 29/06* (2013.01); *H04L 41/0246* (2013.01);
(Continued)

(58) Field of Classification Search
CPC .... H04L 65/602; H04L 29/06; H04L 41/0246
(Continued)

(56) References Cited

U.S. PATENT DOCUMENTS

| 5,812,773 A | 9/1998 | Norin |
| 5,889,896 A | 3/1999 | Meshinsky et al. |

(Continued)

FOREIGN PATENT DOCUMENTS

| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — Duyen M Doan
(74) *Attorney, Agent, or Firm* — Polsinelli PC

(57) ABSTRACT

A system for streaming packet captures over the Internet includes multiple network access devices, each operating as one of a gateway device, a wireless access point, and a network switch, and a management server communicatively coupled to the network access devices over the Internet for managing the network access devices. The management server maintains a persistent hypertext transport protocol (HTTP) connection with each of the network access devices over the Internet. The management server is to generate a bytecode based on a filtering expression for packet captures (PCAPs) representing one or more PCAPs filtering rules, transmit the bytecode to the network access devices without requiring the network access devices to compile the PCAPs filtering rules, receive PCAPs from the network access devices captured by the network access devices based on the
(Continued)

PCAPs filtering rules, and merge the PCAPs received from the network access devices into merged PCAPs.

17 Claims, 10 Drawing Sheets

Related U.S. Application Data continuation of application No. 13/829,839, filed on Mar. 14, 2013, now Pat. No. 9,043,439.

(51) Int. Cl.
  *H04L 29/08* (2006.01)
  *H04L 12/947* (2013.01)
  *H04L 12/24* (2006.01)
  *H04L 12/26* (2006.01)

(52) U.S. Cl.
  CPC ............ *H04L 43/028* (2013.01); *H04L 49/25* (2013.01); *H04L 63/0227* (2013.01); *H04L 67/02* (2013.01)

(58) Field of Classification Search
  USPC .......................................... 709/223–225, 219
  See application file for complete search history.

(56) References Cited

U.S. PATENT DOCUMENTS

| | | | |
|---|---|---|---|
| 6,108,782 A | 8/2000 | Fletcher | |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,490,617 B1 * | 12/2002 | Hemphill | H04L 41/0213 709/223 |
| 6,643,260 B1 | 11/2003 | Kloth et al. | |
| 6,683,873 B1 | 1/2004 | Kwok et al. | |
| 6,721,804 B1 | 4/2004 | Rubin | |
| 6,733,449 B1 | 5/2004 | Krishnamurthy et al. | |
| 6,735,631 B1 | 5/2004 | Oehrke et al. | |
| 6,996,615 B1 | 2/2006 | McGuire | |
| 7,054,930 B1 | 5/2006 | Cheriton | |
| 7,058,706 B1 | 6/2006 | Lyer et al. | |
| 7,062,571 B1 | 6/2006 | Dale et al. | |
| 7,111,177 B1 | 9/2006 | Chauvel et al. | |
| 7,203,173 B2 * | 4/2007 | Bonney | H04L 43/045 370/242 |
| 7,212,490 B1 | 5/2007 | Kao et al. | |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,606,147 B2 | 10/2009 | Luft et al. | |
| 7,647,594 B2 | 1/2010 | Togawa | |
| 7,773,510 B2 | 8/2010 | Back et al. | |
| 7,808,897 B1 | 10/2010 | Mehta et al. | |
| 7,881,957 B1 | 2/2011 | Cohen et al. | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,301,746 B2 | 10/2012 | Head et al. | |
| 8,345,692 B2 | 1/2013 | Smith | |
| 8,406,141 B1 | 3/2013 | Couturier | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,356 B2 | 7/2013 | Ashok et al. | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder | |
| 8,547,974 B1 | 10/2013 | Guruswamy | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andries et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,850,182 B1 | 9/2014 | Fritz et al. | |
| 8,856,339 B2 | 10/2014 | Mestery et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal et al. | |
| 8,977,754 B2 | 3/2015 | Curry, Jr. et al. | |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,313,048 B2 | 4/2016 | Chang et al. | |
| 9,361,192 B2 | 6/2016 | Smith et al. | |
| 9,380,075 B2 | 6/2016 | He et al. | |
| 9,432,294 B1 | 8/2016 | Sharma et al. | |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,613,078 B2 | 4/2017 | Vermeulen et al. | |
| 9,628,471 B1 | 4/2017 | Sundaram et al. | |
| 9,658,876 B2 | 5/2017 | Chang et al. | |
| 9,692,802 B2 | 6/2017 | Bicket et al. | |
| 9,755,858 B2 | 9/2017 | Bagepalli et al. | |
| 2001/0039579 A1 * | 11/2001 | Trcka | G06F 21/552 709/224 |
| 2002/0073337 A1 | 6/2002 | Ioele et al. | |
| 2002/0143928 A1 | 10/2002 | Maltz | |
| 2002/0166117 A1 | 11/2002 | Abrams et al. | |
| 2002/0174216 A1 | 11/2002 | Shorey et al. | |
| 2003/0018591 A1 * | 1/2003 | Komisky | H04L 45/00 706/1 |
| 2003/0056001 A1 | 3/2003 | Mate et al. | |
| 2003/0228585 A1 | 12/2003 | Inoko et al. | |
| 2004/0004941 A1 | 1/2004 | Malan et al. | |
| 2004/0095237 A1 | 5/2004 | Chen et al. | |
| 2004/0131059 A1 | 7/2004 | Ayyakad et al. | |
| 2004/0264481 A1 | 12/2004 | Darling et al. | |
| 2005/0060418 A1 | 3/2005 | Sorokopud | |
| 2005/0125424 A1 | 6/2005 | Herriott et al. | |
| 2006/0104286 A1 | 5/2006 | Cheriton | |
| 2006/0126665 A1 | 6/2006 | Ward | |

(56) References Cited

U.S. PATENT DOCUMENTS

| | | |
|---|---|---|
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott |
| 2011/0307531 A1 | 12/2011 | Gaponenko et al. |
| 2011/0320870 A1 | 12/2011 | Kenigsberg |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |

(56) References Cited

U.S. PATENT DOCUMENTS

| | | |
|---|---|---|
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0119428 A1* | 5/2014 | Catchpole ........ H04N 21/47217 375/240.02 |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1* | 4/2015 | Wada ................. H04L 43/0882 709/224 |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0171158 A1 | 6/2017 | Hoy et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.

(56) References Cited

OTHER PUBLICATIONS

Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11$^{th}$ International Conference on Computer and Information Science, 2012 IEEE, 5 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.

\* cited by examiner

METHOD FOR STREAMING PACKET CAPTURES FROM NETWORK ACCESS DEVICES TO A CLOUD SERVER OVER HTTP

CROSS-REFERENCES TO RELATED APPLICATIONS

This application is a continuation of U.S. patent application Ser. No. 14/704,417, entitled "METHOD FOR STREAMING PACKET CAPTURES FROM NETWORK ACCESS DEVICES TO A CLOUD SERVER OVER HTTP," filed on May 5, 2015 which in turn, is a continuation of U.S. patent application Ser. No. 13/829,839, entitled "METHOD FOR STREAMING PACKET CAPTURES FROM NETWORK ACCESS DEVICES TO A CLOUD SERVER OVER HTTP," filed on Mar. 14, 2013, all of which are incorporated by reference herein in their entireties for all purposes.

FIELD OF THE INVENTION

Embodiments of the present invention relate generally to packet capturing. More particularly, embodiments of the invention relate to streaming packet captures from network access devices to a cloud server over HTTP.

BACKGROUND

Packet capture (PCAP) is the act of capturing data packets crossing a computer network. Deep packet capture (DPC) is the act of capturing, at full network speed, complete network packets (e.g., header and payload) crossing a network with a high traffic rate. Once captured and stored, either in short-term memory or long-term storage, software tools can perform deep packet inspection (DPI) to review network packet data, perform forensics analysis to uncover the root cause of network problems, identify security threats, and ensure data communications and network usage complies with outlined policy. Some DPCs can be coupled with DPI and can as a result manage, inspect, and analyze all network traffic in real-time at wire speeds while keeping a historical archive of all network traffic for further analysis.

Typically, in order to configure a network device to perform PCAPs, one has to set up certain PCAP rules. Traditionally, setting up a remote packet capture is a manually intensive process that can only be run on the network devices with enough resources (e.g., CPU, memory, and storage) to do all the filtering and store the results on the machine where the PCAP is taking place. For example, an administrator must log into the device; the device must have a program to execute the packet capture; it must run the capture and store the results locally; and then, via a separate process, one must transfer the results (which may be large) from the remote device to a local device for additional analysis.

This may be difficult or impossible if the device does not have enough disk space to store the capture or the device is not remotely accessible. If one wants to run this process across multiple devices, for instance capturing across multiple access points (APs), she must repeat every step and then try to merge the results together. Finally, this process does not take place over a standard service, so accessing from remote devices may be difficult.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
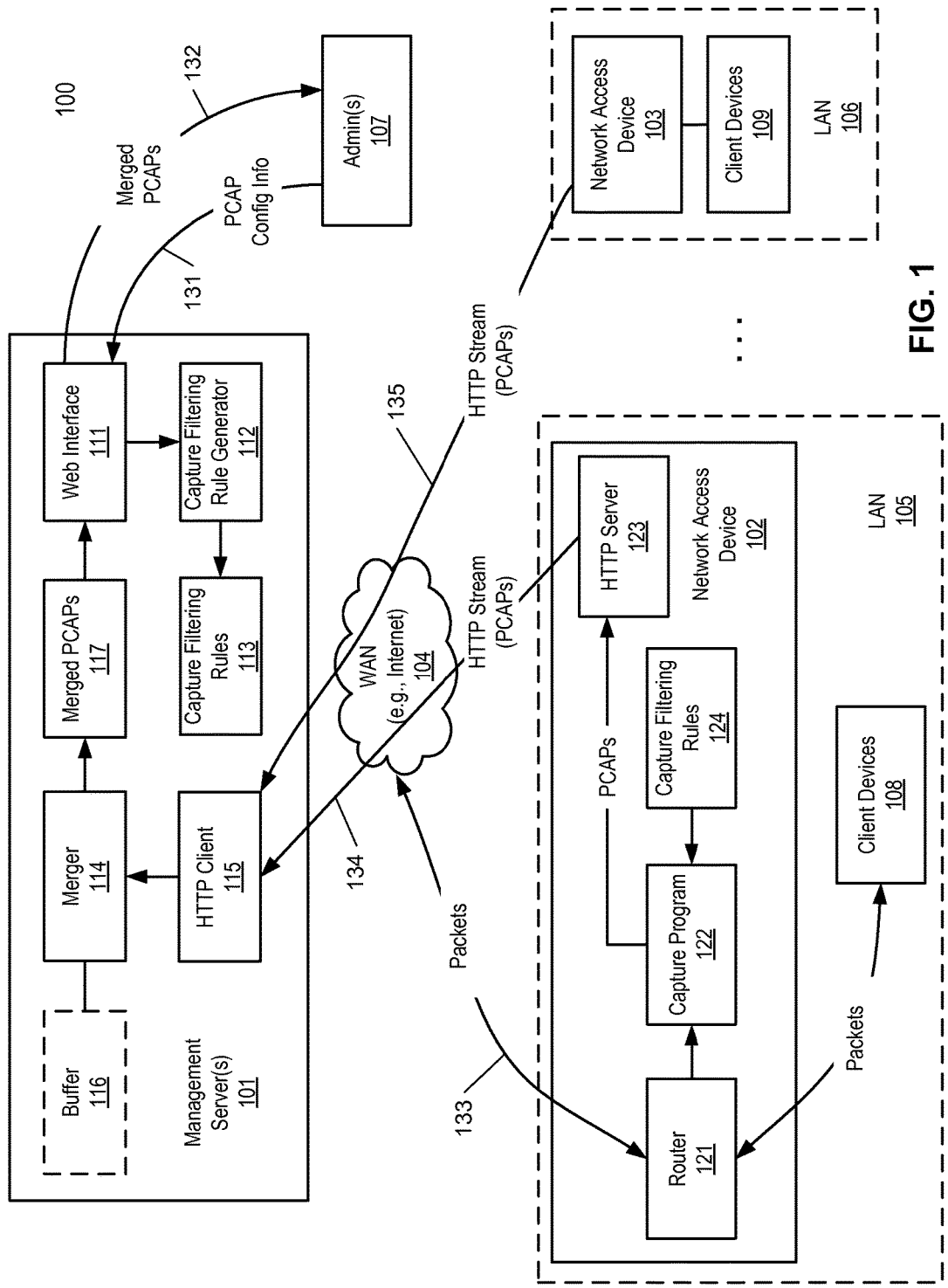
FIG. 1 is a block diagram illustrating a cloud managed network system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a centralized backend server (e.g., Web-based or cloud-based management server) maintains a persistent network connection such as a hypertext transport protocol (HTTP) connection with each of packet capturing devices. A network access device can be one of a gateway device, an access point (AP), and a network switch, which provides network access to one or more client devices over a local area network (LAN). In one embodiment, a management server presents a Web interface that has the same inputs as traditional packet captures, allowing a user to select which remote devices to run the capture on and start a packet capture session. In one embodiment, the management server receives one or more expressions, such as a TCPDUMP expression, from the Web interface for packet captures in one or more of the network access devices. The management server compiles the expressions into bytecode that is platform independent and allows the capture devices themselves to do filtering without having them to be capable of translating expressions into bytecode. Alternatively, the expressions or information representing filtering rules can be transmitted from the management server to at least some of the network access devices. The network access devices can then compile the received information into a set of one or more filtering rules for packet capturing. Each of the network access devices maintains a management tunnel (mTunnel) with the management server so that a management server can connect to the network access devices, for example, for distributing packet capturing information and/or reporting captured packets.

In one embodiment, each of the network access devices that perform packet capture includes a HTTP server component running therein that uses HTTP-chunking to stream captured information of packets to a HTTP client component running within the management server. The management server creates a process that initiates an HTTP connection to each capture device which streams results back and merges multiple PCAP streams together to a merged stream, including reordering and/or deduplicating the PCAP packets. The server component of a network access device streams the results of the process over a HTTP-chunked connection that will work over a standard Web server. In one embodiment, the management server parses the output and streams an output such as a TCPDUMP text output to the user over a Web service.

FIG. 1 is a block diagram illustrating a cloud-managed network system according to one embodiment of the invention. Referring to FIG. 1, system 100 includes, but is not limited to, various network access devices (NADs) 102-103 (which may be wired and/or wireless) managed by a management server (MS) 101 over WAN 104, where WAN 104 may be the Internet. Management server 101 may be a Web or cloud server, or a cluster of servers, running on server hardware. Each of network access devices 102-103 is associated with a LAN such as LANs 105-106. Network access devices 102-103 may operate as a gateway device, an access point (AP), a network switch, or a combination thereof to LANs 105-106, respectively, where various client devices 108-109 can be communicatively coupled to LANs 105-106. Any of network access devices 102-103 may be located behind another network access device. Network access devices 102-103 may be associated or owned by a network owner or operator (e.g., corporation, enterprise) and managed via management server 101. Note that for the purpose of illustration, although network access device 103 is not shown with details therein, network access device 103 has the same or similar architecture as network access device 102. For the purpose of illustration, only two network access devices are shown. However, it is not so limited; additional network access devices may be coupled to network 104 and managed by management server 101.

According to one embodiment, network access devices 102-103 may represent "capture devices" that a network operator (e.g., administrator 107) wishes to capture packets from. Each of network access devices 102-103 is connected to management server 101 (e.g., backend system) via an Internet protocol (IP) tunnel referred to herein as an "mTunnel." Each capture device runs a Web service that a program can connect to over an mTunnel. A user connects to a "Web service" which can run programs that can access devices over the mTunnel. When the user selects to run a packet capture, the Web service connects to a program that streams from multiple capture devices (e.g., network access devices 102-103) to aggregate multiple streams into one that it itself streams back to the end user, either via an update to a Web interface or via a download.

Referring back to FIG. 1, in one embodiment, management server 101 includes Web interface 111 to allow a user such as administrator 107 to access resources of management server such as management tools for managing network access devices 102-103. Via Web interface 111, user 107 can provide, via path 131, PCAP configuration information regarding how PCAPs are to be performed. Based on the PCAP configuration information, capture filtering rule generator 112 is to compile and generate bytecode representing one or more capture filtering rules 113. Capture filtering rules 113 are then downloaded to any of network access devices 102-103, for example, as part of capture filtering rules 124. In one embodiment, as part of PCAP configuration information, user 107 may specify via Web interface 111 which of network access devices 102-103 will receive the capture filtering rules 113.

A conventional system requires user 107 to individually log into each of the network access devices that perform the packet captures to specify the PCAP configuration. Such a manual process is tedious and error prone. In one embodiment, by compiling the PCAP configuration information into bytecode representing the PCAP filtering rules, the network access devices do not need the processing resources that are required to compile the same filtering rules. Since the typical bytecode is much smaller in size (e.g., around 20 bytes) compared to a typical HTTP expression that sets up the filtering rules, it takes much less resource or bandwidth to transmit from management server 101 to network access devices 102-103 and it takes less processing resource in the network access devices to execute the bytecode.

According to another embodiment, a network access device may have enough processing power or bandwidth to maintain a rule generator such as rule generator 112 to compile the packet capturing information to generate capture filtering rules 124. In such an embodiment, management server 101 receives packet capturing information from user 107 via Web interface 111. User 107 can specify via Web interface 111 which of the network access devices 105-106 would receive the packet capturing information. The capturing information representing filtering rules can be transmitted from the management server 101 to at least some of the network access devices 105-106. The network access devices 105-106 can then compile the received information into a set of one or more filtering rules, such as rules 124, for packet capturing.

According to one embodiment, each of network access devices 102-103 maintains a persistent mTunnel with management server 101. The bytecode representing capture filtering rules 113 is downloaded over the mTunnels to the specified network access devices, in this example, as part of capture filtering rules 124 of network access device 102. The capture filtering rules may be carried by a user datagram protocol (UDP) packet that is encapsulated in another packet and tunneled to network access device 102 such as UDP over IP (UDP/IP) encapsulation or UDP over HTTP (UDP/HTTP) encapsulation. Network access device 102 includes a router 121 to route packets exchanged between its client devices 108 and the Internet 104 via path 133. In addition, network access device 102 includes a capture program 122 (also referred to as a packet analyzer) coupled to router 121 to capture packets or packet information (e.g., parameters) that satisfy capture filtering rules 124. Note that the network access devices 105-106 can capture packets even if those packets are not being routed to or from the Internet via any kind of Layer 3 (i.e., IP layer) routing; the packet capturing can be done at Layer 2 (i.e., media access control or MAC layer). Thus, even when the network access devices 105-106 are operating in a "bridge mode" and not themselves performing any routing at Layer 3, they can still perform packet capturing at Layer 2. Of course, the network access device must themselves have layer 3 connectivity (i.e. an IP address) in order to communicate with the management server 101.

Capture program 122 may be implemented as part of router 121 or a network stack of an operating system of network access device 102. Alternatively, capture program 122 may be a third-party packet capture utility such as TCPDUMP utility. TCPDUMP is a packet analyzer that runs under the command line. It allows the user to intercept and display TCP/IP and other packets being transmitted or received over a network to which the computer is attached. TCPDUMP works on most LINUX operating systems.

According to one embodiment, network access device 102 includes an HTTP server component 123 that is communicatively coupled to HTTP client component 115 of management server 101 to maintain a persistent HTTP connection. The persistent HTTP connection may be part of an mTunnel between management server 101 and network access device 102. HTTP client 115 and HTTP server 123 work with each other to maintain an open HTTP connection. In one embodiment, when network access device 102 powers up and contacts management server 101, HTTP client 115 sends an HTTP request to HTTP server 123. Instead of immediately responding to the HTTP request, HTTP server 123 may withhold the HTTP response until there is data to be sent to management server 101. Alternatively, the initial HTTP request from client 115 to server 123 happens when the administer requests a new PCAP to start, rather than when NAD 102 boots up. The HTTP server 123 receives configuration parameters about the new PCAP (e.g., the byte code for the filtering rules, the duration of the PCAP, maximum number of packets to capture, etc) as HTTP parameters that are part of that initial HTTP fetch. HTTP client 115 would start a new fetch for each PCAP that is requested, rather than immediately starting one once NAD 102 boots up. In one embodiment, when capture program 122 captures the PCAP information based on capture filtering rules 124, the PCAP information is handed over to HTTP server 123. In response, HTTP server 123 transmits the PCAP information as part of a pending HTTP response to HTTP client 115. In one embodiment, once HTTP client 115 receives an HTTP response from HTTP server 123, HTTP client 115 immediately sends another HTTP request to HTTP server 123, which will be withheld to maintain the HTTP connection open.

According to one embodiment, the PCAP information is streamed by HTTP server 123 to HTTP client 115 using HTTP streaming protocols, such as HTTP streaming or HTTP live streaming protocol. HTTP streaming (also referred to as HTTP server push) is a mechanism for sending data from a Web server (e.g., HTTP server) to a Web browser (e.g., HTTP client). Generally the Web server does not terminate a connection after response data has been served to a client. The Web server leaves the connection open so that if an event is received, it can immediately be sent to one or more clients. Otherwise, the data would have to be queued until the client's next request is received. HTTP live streaming (HLS) is an HTTP-based media streaming communications protocol. It works by breaking the overall stream into a sequence of small HTTP-based file downloads, each download loading one short chunk of an overall potentially unbounded transport stream. Since its requests use only standard HTTP transactions, HTTP live streaming is capable of traversing any firewall or proxy server that lets through standard HTTP traffic, unlike UDP-based protocols.

According to one embodiment, HTTP server 123 of network access device 102 listens for an incoming HTTP connection (e.g., HTTP request) from HTTP client 115 of management server. Once the HTTP connection has been established, capture program 122 starts capturing packet information based on capture filtering rules 124 and streams back via path 134 the capture result to management server 101 via HTTP server 123. In one embodiment, packet capture program 122 selects an interface, a time or packet limit, and loads the byte code 124 into the kernel memory so that capture program 122 will filter and unwanted packets. Alternatively, capture filtering rules 124 and the interface and time/packet limits information used by capture program 122 are provided as part of HTTP parameters in the HTTP fetch from client 115 to server 123. For any packets it reads back it streams to its output, and once the stream ends (or times out) it closes the connection and the stream ends. Similarly, network access device 103 streams the respective capture result to management server 101 via path 135.

When HTTP client 115 collects the HTTP streams from network access devices 102-103, the HTTP streams are handed over to merger 114. The HTTP streams may be temporarily stored in buffer 116 for reordering and/or deduplication purposes. Merger 114 merges, with optional reordering and deduplication, the received HTTP streams into merged PCAP stream 117 to allow user 107 to download it through Web interface 111 via path 132.

Figure 2:
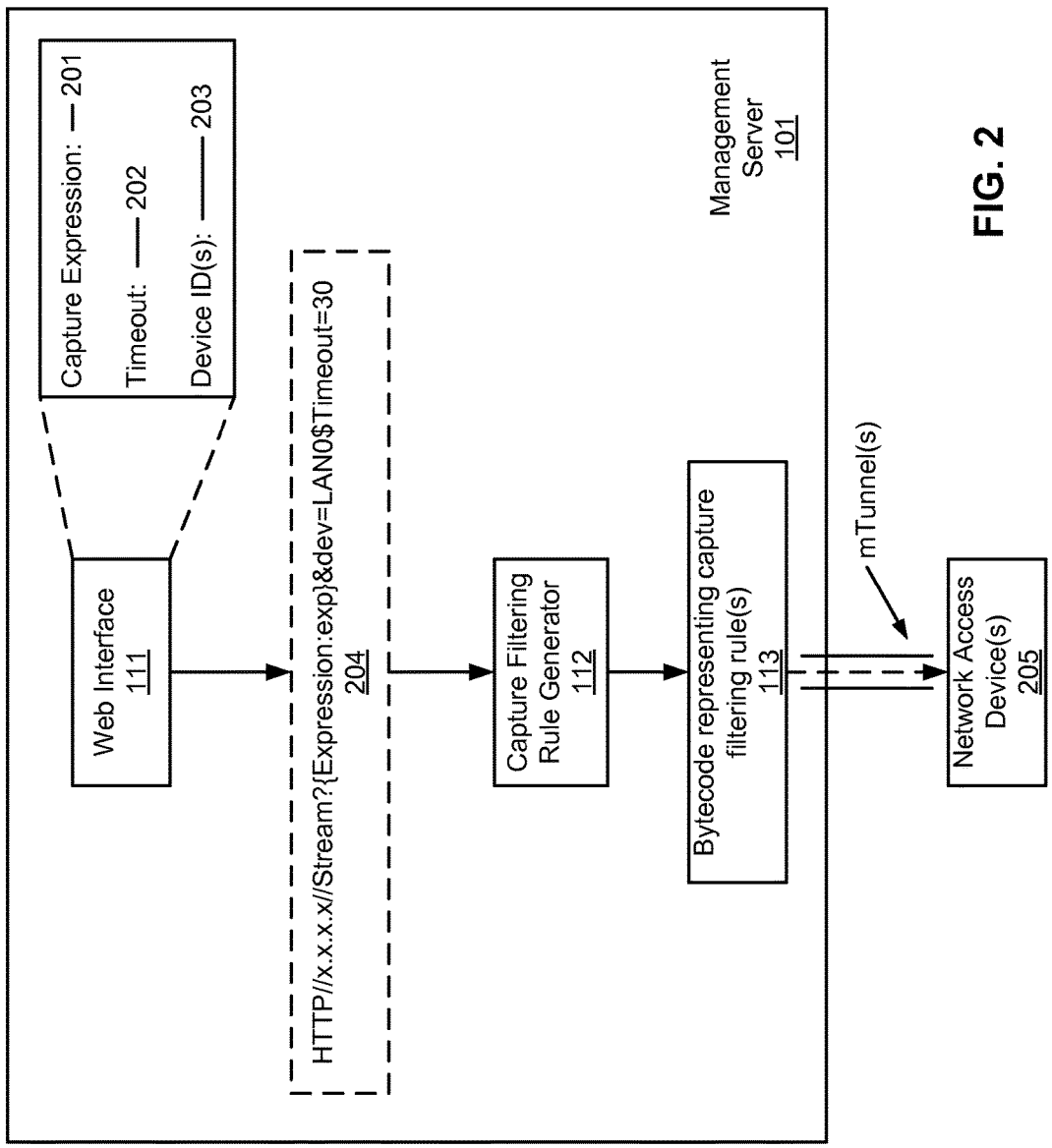
FIG. 2 is a block diagram illustrating a block diagram of a management server according to one embodiment of the invention.

FIG. 2 is a block diagram illustrating a block diagram of a management server according to one embodiment of the invention. Referring to FIG. 2, Web interface 111 provides a graphical user interface (GUI) or an application programming interface (API) to allow a user to specify PCAP configuration information. In one embodiment, the PCAP configuration information includes, but is not limited to, capture expression 201, timeout 202, and one or more device identifiers (IDs) 203 that identify one or more network access devices (e.g., network access devices 205) to be configured for PCAPs. For example, expression 201 may identify at least the host address (e.g., Web site) and one or more LAN interfaces and/or ports through which the network access device should monitor and/or capture the packets, such as, for example, "ip dst 10.1.1.1 and port 5555." The PCAP configuration may be constructed representing a universal resource locator (URL), such as URL 204 that a typical client device may request to access a particular Web resource. The expression 201 may further include an amount of traffic or a period of time during which the network access device should capture. Based on the PCAP configuration information, capture filtering rule generator 112 is to generate one or more bytecodes 113 representing the capture filtering rules. Bytecode 113 is then downloaded to one or more of network access devices 205 that are identified by device IDs 203, where the bytecode may be transmitted via the corresponding mTunnel(s). Alternatively, the PCAP configuration information may be transmitted, via the respective mTunnel, from management server 101 to network access device(s) 205 to allow the network access device(s) 205 to compile the packet capturing rules.

Figure 3:
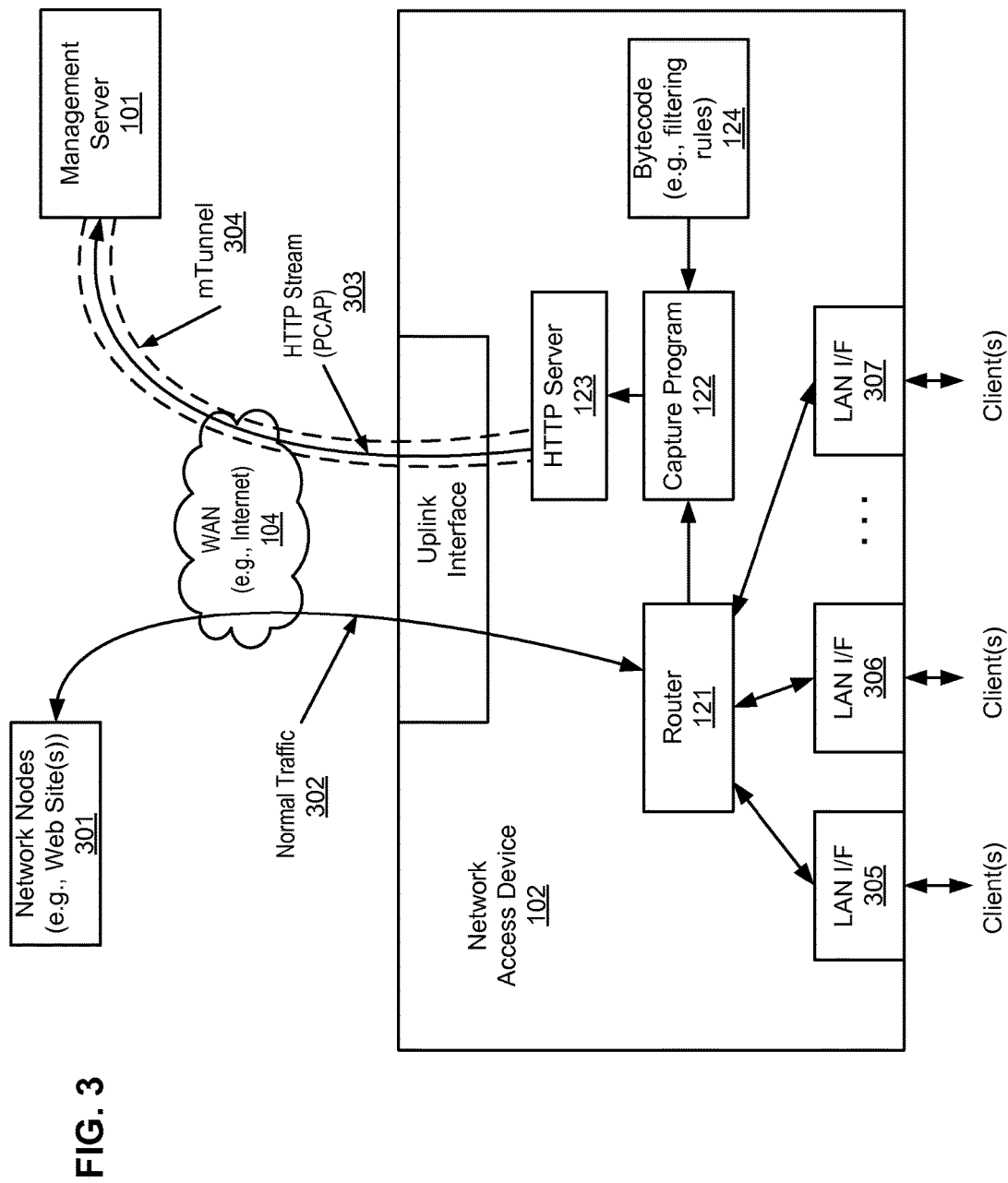
FIG. 3 is a block diagram illustrating an example of a network access device according to one embodiment of the invention.

FIG. 3 is a block diagram illustrating an example of a network access device according to one embodiment of the invention. Referring to FIG. 3, after bytecode 124 has been downloaded (or received as part of a HTTP request) from management server 101 via mTunnel 304, bytecode 124 is loaded into a kernel of an operating system (e.g., LINUX) of network access device 102 and utilized by capture program 122 as part of capture filtering rules. In one embodiment, there is a user level program on the network access device which opens a raw socket on the associated network device, and that program attaches the bytecode as a filter on the socket. The operating system provides the facility to do this system call that lets one specify a filter. The end result of this is that the filtering code is loaded into the kernel and used to filter which packets are sent to that socket, and thus which packets are included in the HTTP stream that is sent back from the network access device to the management server.

In one embodiment, capture program 122 communicates with router 121 to monitor certain LAN interfaces such as LAN interfaces 305-307 and capture packets or at least the parameters of the packets exchanged via the selected LAN interfaces based on bytecode 124. Router 121 is responsible for routing packets as part of normal network traffic 302 between client devices associated with LAN interfaces 305-307 and external network node(s) 301 over Internet 104. Any of the LAN interfaces 305-307 may represent physical interfaces such as ports, logical interfaces such as virtual LANs (VLANs), or a combination thereof. Capture program 122 may be implemented as part of router 121, or vice versa. Network access device 102 may be located behind another network access device (e.g., gateway device). According to one embodiment, capture program 122 provides the PCAP information to HTTP server 123. HTTP server 123 then streams the PCAP information 303 to management server 101 via mTunnel 304 using an HTTP streaming protocol. As described above, the packet capturing can be performed at other network layers such as Layer 2.

Figure 4:
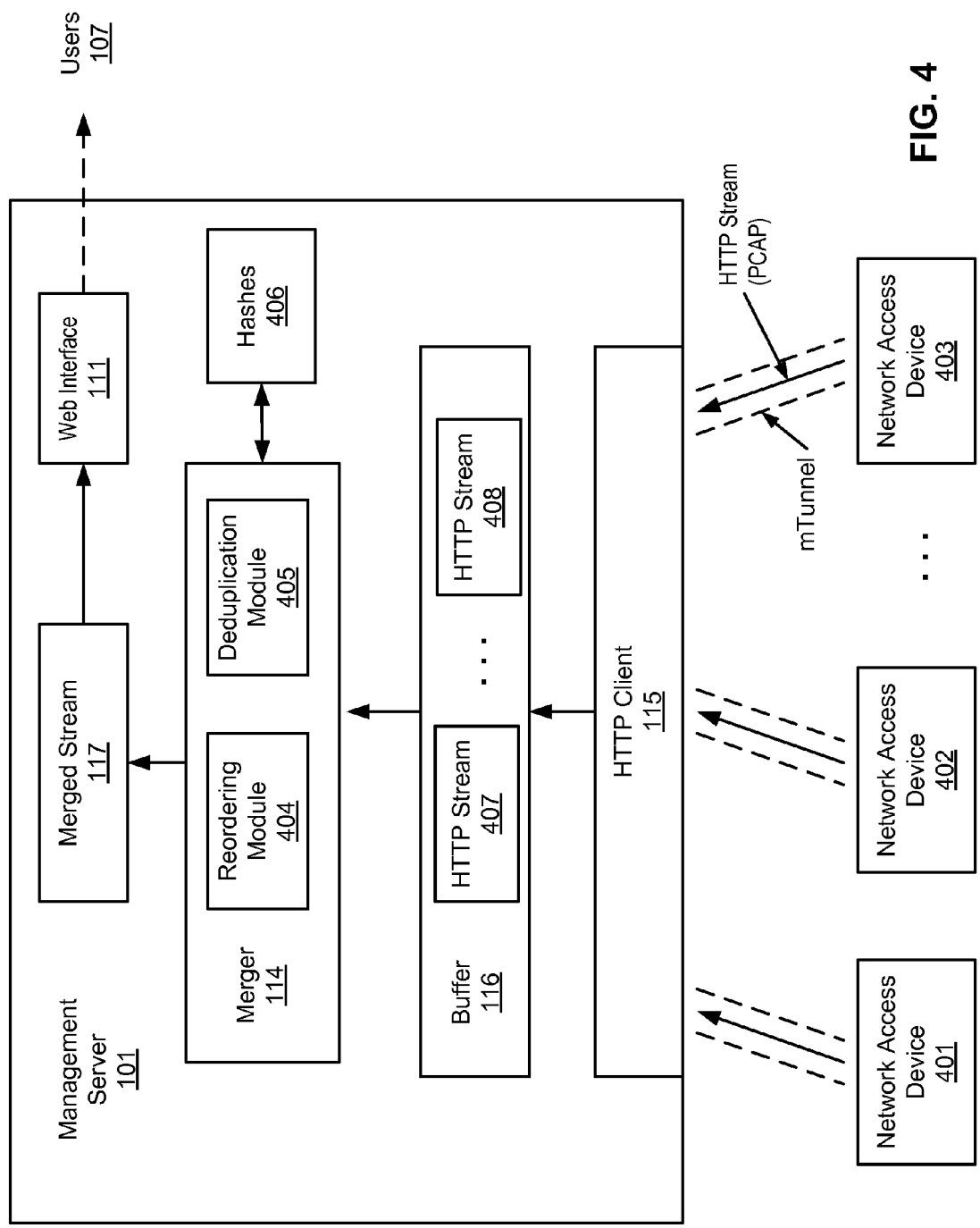
FIG. 4 is a block diagram illustrating an example of a management server according to another embodiment of the invention.

FIG. 4 is a block diagram illustrating an example of a management server according to another embodiment of the invention. Referring to FIG. 4, after HTTP client 155 receives HTTP streams from network access devices 401-403, the HTTP streams are temporarily stored in buffer or queue 116 as part of HTTP streams 407-408. Network access devices 401-403 may represent any of network access devices 102-103 of FIG. 1. Merger 114 is to merge HTTP streams 407-408 into merged HTTP stream 117. In one embodiment, merger 114 includes a reordering module 404 to reorder the packets in HTTP streams 407-408 based on a variety of categories during merging the HTTP streams. In one embodiment, HTTP streams may be reordered based on a timestamp associated with the individual HTTP streams. Alternatively, packets or segments within a particular HTTP stream may also be reordered according to the timestamps of the packets or segments and/or in view of other packets or segments of other HTTP streams.

In addition, according to one embodiment, merger 114 includes a deduplication module 405 to remove any deduplicated stream and/or packets or segments within a stream. In one embodiment, for each packet/segment or stream in merged stream 117, a hash of the content is generated using a predetermined hash function (e.g., SHA-1, MD5) and maintained as part of hashes 406. For a new packet or segment, a new hash is generated and compared with the hashes 406 to determine whether the packet or segment has already been stored in merged stream 117. If the new hash matches one of the hashes 406, it means more likely than not that the corresponding packet/segment exists in merged stream 117. Thus, instead of storing the duplicated packet/segment in merged stream 117 again, the duplicated packet/segment may be dropped or ignored. According to one embodiment, merger 114 further includes a decoder (not shown) that, rather than streaming back the actual packet contents, the decoder interprets and decodes the content and streams back a human-readable text summary of each packet.

Figure 5:
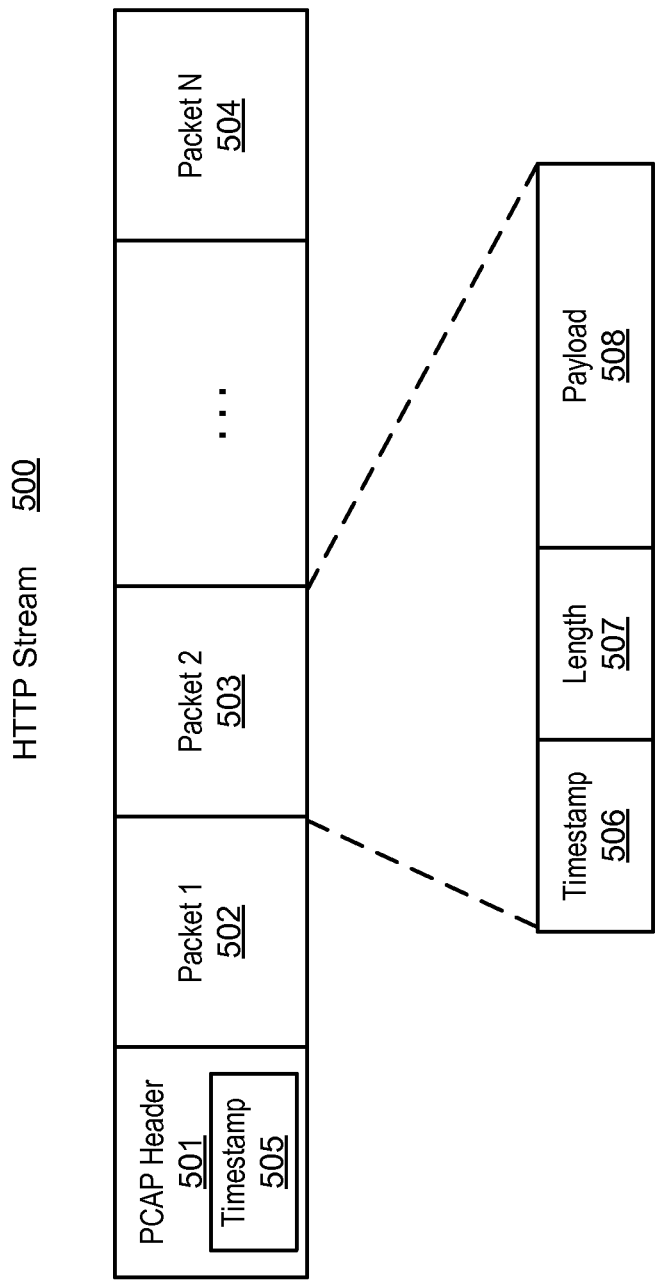
FIG. 5 is a block diagram illustrating an example of an HTTP stream according to one embodiment of the invention.

FIG. 5 is a block diagram illustrating an example of an HTTP stream according to one embodiment of the invention. Referring to FIG. 5, HTTP stream 500 may represent any of HTTP streams 117 and 407-408 of FIG. 4. In one embodiment, HTTP stream 500 includes a PCAP header 501 and one or more packets 502-504. PCAP header 501 further includes a timestamp indicating the time when the current PCAP session was started by the network access device. Each packet includes timestamp 506, length 507, and payload 508. Timestamp 506 indicates the time when the corresponding packet was captured by the network access device. Length 507 specifies the size of payload 508. Based on timestamps 505 and 506, reordering module 404 can reorder the streams received from multiple network access devices and/or packets within the streams.

Figure 6:
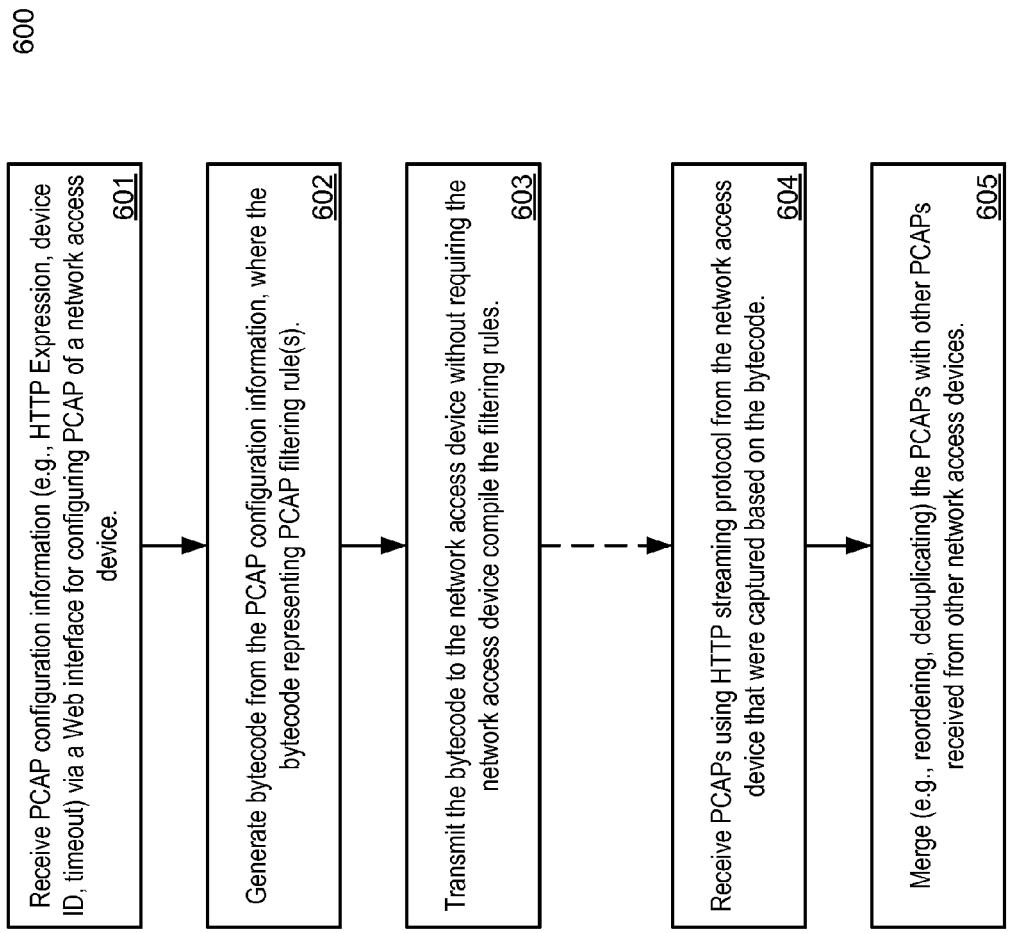
FIG. 6 is a flow diagram illustrating a method for packet captures according to one embodiment of the invention.

FIG. 6 is a flow diagram illustrating a method for packet captures according to one embodiment of the invention. Method 600 may be performed by processing logic, which may include software, hardware, or a combination thereof. For example, method 600 may be performed by management server 101 of FIG. 1. Referring to FIG. 6, at block 601, processing logic receives PCAP configuration information (e.g., expression, device ID, timeout) via a Web interface for configuring PCAP of a network access device. At block 602, processing logic generates bytecode based on the PCAP configuration information, where the bytecode represents one or more PCAP filtering rules. At block 603, the bytecode is transmitted to a network access device over the Internet without requiring the network access device to compile the PCAP filtering rules. Subsequently, at block 604, processing logic receives PCAPs using an HTTP streaming protocol from the network access device, where the PCAPs were captured by the network access device based on the downloaded PCAP filtering rules. At block 605, processing logic merges, with optional reordering and deduplication, the PCAPs with other network access devices. Alternatively, the PCAP configuration information may be transmitted, via the respective mTunnel, from the management server to the network access device(s) to allow the network access device(s) to compile the packet capturing rules (e.g., bytecode).

Figure 7:
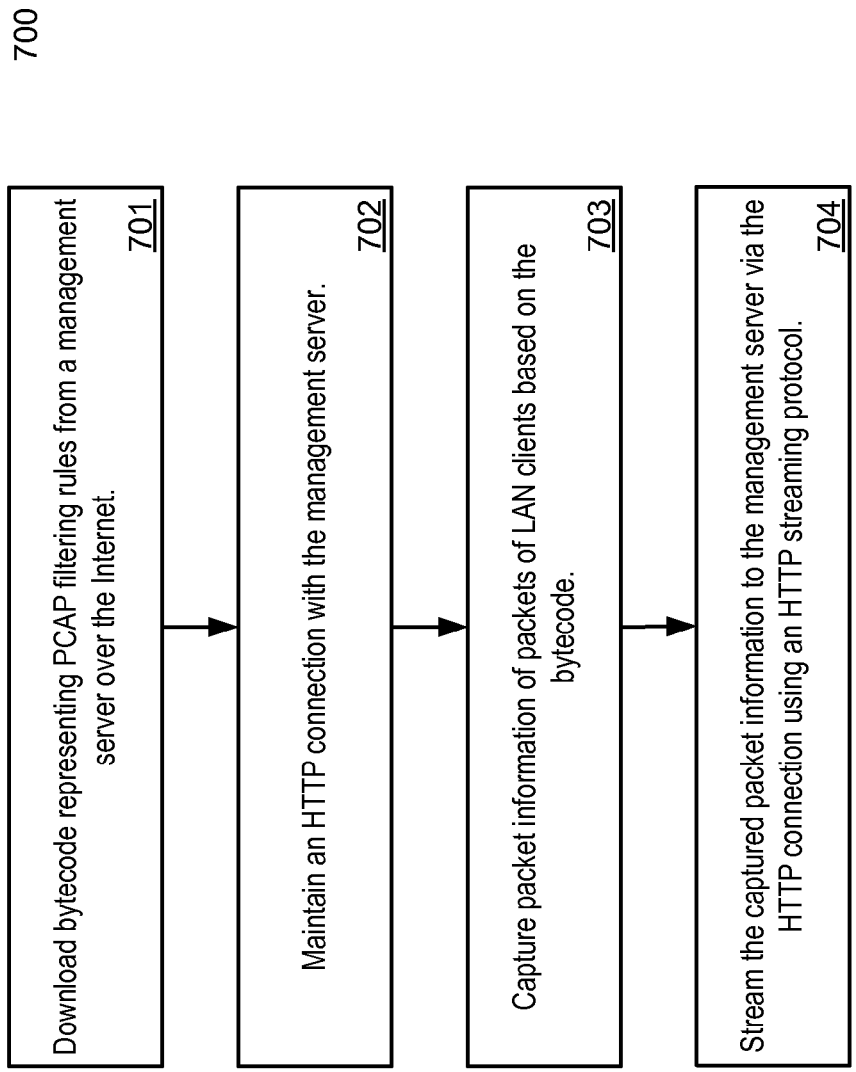
FIG. 7 is a flow diagram illustrating a method for packet captures according to one embodiment of the invention.

FIG. 7 is a flow diagram illustrating a method for packet captures according to one embodiment of the invention. Method 700 may be performed by processing logic, which may include software, hardware, or a combination thereof. For example, method 700 may be performed by any of network access devices 102-103 of FIG. 1. Referring to FIG. 7, at block 701, processing logic downloads bytecode from a management server over the Internet, where the bytecode represents one or more PCAP filtering rules. At block 702, processing logic maintains an HTTP connection with the management server. At block 703, processing logic captures packet information of packets associated with one or more LAN client devices based on the bytecode. At block 704, the captured information is streamed to the management server over the HTTP connection using an HTTP streaming protocol. Alternatively, the network access device downloads the PCAP configuration from the management server and compiles the PCAP configuration into a set of one or more packet capturing filtering rules.

Figure 8A:
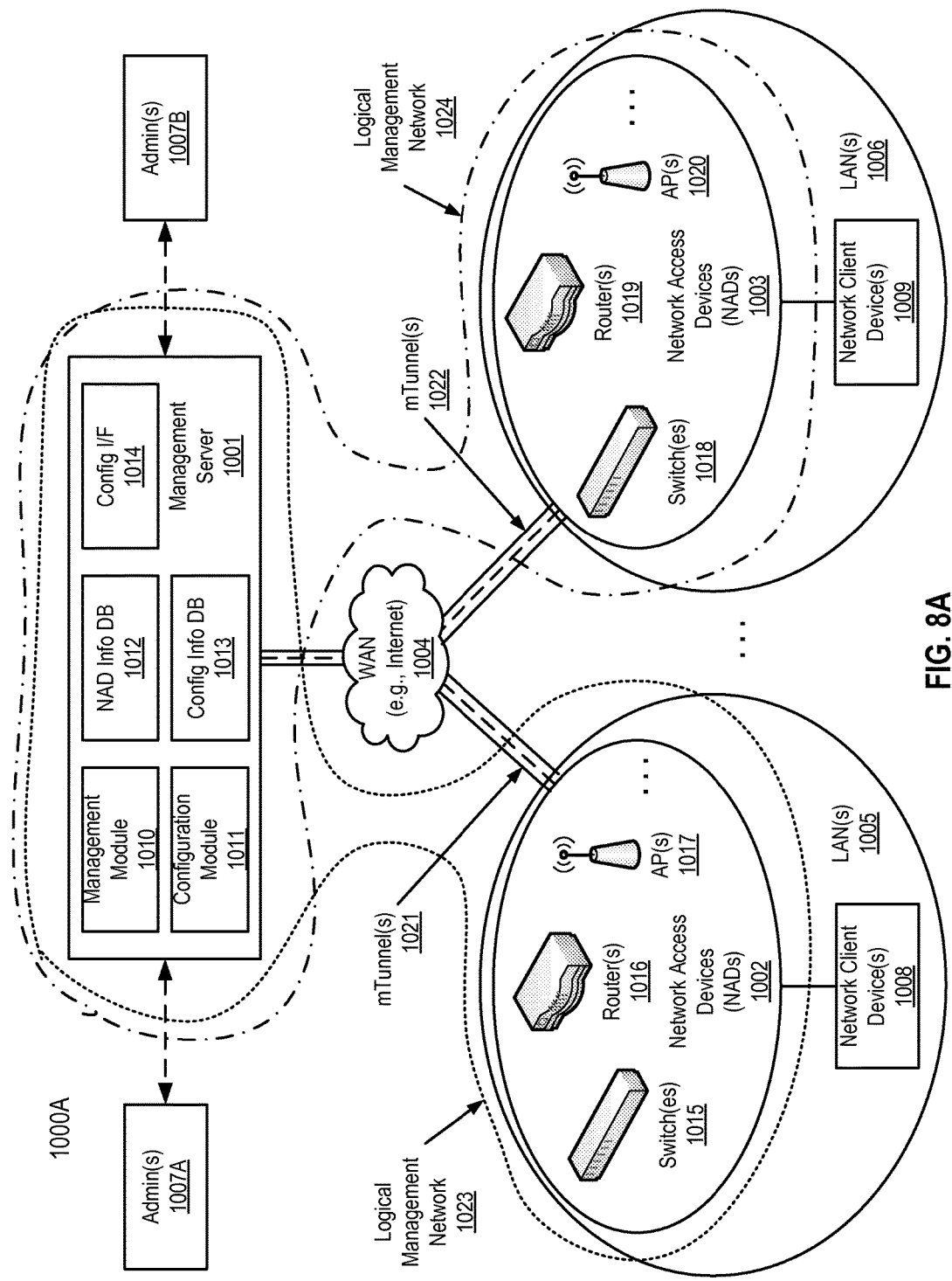
FIGS. 8A and 8B are block diagrams illustrating a cloud managed network configuration according to some embodiments of the invention.

FIG. 8A is a block diagram illustrating a cloud managed network system according to one embodiment of the invention. System 1000A may be implemented as part of any of the network systems described above, such as system 100 of FIG. 1. Referring to FIG. 10A, system 1000A includes, but is not limited to, various network access devices (NADs) 1002-1003 managed by a management server 1001 over WAN 1004. Management server 1001 may be a Web or cloud server, or a cluster of servers, running on server hardware. Each of network access devices 1002-1003 may be associated with a LAN such as LANs 1005-1006. A LAN herein may also refer to a sub-network or network segment (e.g., subnet or a virtual LAN (VLAN)) of a larger LAN (e.g., Intranet). Network 1004 may be the Internet. Any of network access devices 1002-1003 may operate as a gateway device (e.g., routers 1016 and 1019), an access point (AP) (e.g., APs 1017 and 1020), a network switch (e.g., switches 1015 and 1018), or a combination thereof to LANs 105-106, wired or wireless, where various network client devices (NCDs) 1008-1009, also referred to as LAN devices, can be communicatively coupled to LANs 105-106.

According to one embodiment, a network access device may represent a gateway device interfacing a LAN to WAN 1004 and performs network address translation (NAT) for its clients, which may be client devices 1008-1009 or other network access devices. A network access device may be configured behind another network access device. For example, an uplink of an access point may be coupled to a downlink of a gateway device. Alternatively, an uplink of a network switch may be coupled to a downlink of a gateway device or an access point, etc. A network access device may be an integrated device integrating two or more of these functionalities (e.g., router/gateway, access point, and/or network switch), wired and/or wireless.

Referring back to FIG. 8A, in one embodiment, management server 1001 works for both single and multi-tenant installations, meaning that multiple organizations (e.g., corporate clients) with different network administrators may have network access devices managed by the same management server, and network configuration or management can be performed using the same management server, but that are firewalled off from each other and do not have access to each other's network configurations. In this example, network access devices 1002 and network access devices 1003 may be associated with or owned by the different organizations and administered by different network administrators 1007A and 1007B associated with the organizations. Some of network access devices 1002 may communicate with each other to form a local mesh network, while some of network access devices 1003 may communicate with each other to form another local mesh network.

According to one embodiment, management server 1001 includes a management module 1010 and a configuration module 1011 to manage and to configure network access devices 1002-1003 and to generate management server configuration information for each of network access devices 1002-1003, which may be stored in configuration information database 1013. In one embodiment, management server 1001 provides a user interface 1014 such as a Web interface to allow a network administrator such as administrators 1007A and 1007B to create and log into an account associated with an organization to which the network access devices 1002 or network access devices 1003 belong.

The management server 1001 further includes a NAD information database 1012, including information regarding the network access devices 1002-1003. In one embodiment, the NAD information database 1012 includes a serial number and a mechanism to authenticate the network access device's identity (e.g., the public key of a private public key pair, the private key of which was embedded or stored in the network access device during the manufacturing). NAD information database 1012 may be populated different ways in different embodiments (e.g., populated by the seller of the network access devices, populated by the network administrator). In embodiments in which this information is populated by the seller, different ones of these embodiments may associate the information regarding network access devices 1002-1003 in the router information database with the user account in different ways (example, network administrators 1007A and 1007B may provide an order number (or invoice number) associated with a purchase of network access devices 1002 or 1003).

According to one embodiment, when a network access device is powered up and attempts entering network 1004, the network access device attempts to contact management server 1001. In one embodiment, certain device information such as an IP address and domain name service (DNS) name of management server 1001 is stored in the network access device when it is manufactured. In one embodiment, when the network access device is powered up, the network access device performs any self-configuration processes including obtaining an IP address for itself from a dynamic host configuration protocol (DHCP) facility (which address may be a public IP address, or may be a private IP address if there is a device performing NAT between the router and the WAN (that is to say, the network access device is behind a device performing NAT)). The network access device then accesses management server 1001 based on the server's IP address and authenticates itself (e.g., signing a message (e.g., including the serial number of the network access device) using a private key associated (and/or stored) with the network access device, such that management server 1001 can authenticate the network access device using the associated public key (stored in NAD information database 1012) maintained by management server 1001).

In one embodiment, each of network access devices 102-103 creates one or more secure communication channels (e.g., a control tunnel) with server 1001 using the keys downloaded from management server 101 to exchange control traffic such as management messages or notification, operating statuses of the network access device, etc. Such a tunnel for network management purposes is referred to herein as an mTunnel. In this example, network access devices 1002 maintain at least one mTunnel 1021 with management server 1001 and network access devices 1003 maintain at least one mTunnel 1022 with management server 1001. In one embodiment, each of network access devices 1002 may maintain a persistent mTunnel with management server 1001. Alternatively, only the network access device operating as a gateway device maintains an mTunnel with management server 1001, while other network access devices behind the gateway device communicate with the gateway device to share the same mTunnel. In one embodiment, a network access device operating as a gateway performs network address translation (NAT) for its clients, which may be a network client device or another network access device.

In one embodiment, once a network access device has been successfully authenticated by server 1001, the network access device downloads configuration information and stores it in a storage device within the network access device. This download may take place over a secure session layer (SSL)-encrypted session and/or the management server may encrypt the data using the public key corresponding to the private key. This secure channel may also be used to receive subsequent configuration updates from management server 1001. According to one embodiment, subsequently, when there is a change in the configuration, such as adding or removing a network access device, changing of subnet settings (for example, by an administrator such as administrators 1007A and 1007B via a Web interface of management server 1001), management server 1001 is to generate updated configuration information and communicate the updates to the network access devices via their corresponding mTunnels (such communication can be done with different mechanisms depending on the embodiment of type of information, including a push mechanism, a pull mechanism, etc.).

A variety of tunneling protocols can be utilized over an mTunnel between a network access device and management server 1001, such as, for example, Internet protocol (IP) over user datagram protocol (UDP) (IP/UDP) encapsulation. UDP is one of the core members of the Internet Protocol Suite, the set of network protocols used for the Internet. With UDP, computer applications can send messages, in this case referred to as datagrams, to other hosts on an IP protocol network without requiring prior communications to set up special transmission channels or data paths. UDP uses a simple transmission model without handshaking dialogues for providing reliability, ordering, or data integrity. Thus, UDP provides an unreliable service and datagrams may arrive out of order, appear duplicated, or go missing without notice. UDP assumes that error checking and correction is either not necessary or performed in the application, avoiding the overhead of such processing at the network interface level. Time-sensitive applications often use UDP because dropping packets is preferable to waiting for delayed packets, which may not be an option in a real-time system. If error correction facilities are needed at the network interface level, an application may use the Transmission Control Protocol (TCP), which is designed for this purpose. UDP applications use datagram sockets to establish host-to-host communications. An application binds a UDP socket to its endpoint of data transmission, which is a combination of an IP address and a UDP port.

For example, a network management message may be carried as an IP packet and the IP packet may be encapsulated within a UDP packet exchanged between a network access device and management server 1001 over a respective mTunnel. In one embodiment, an IP packet having one or more network management messages embedded therein may be wrapped with a predetermined mTunnel header and is transmitted within a UDP packet between management server 1001 and a network access device, even if the network access device is behind a NAT device.

In some configurations, if a network access device is behind a firewall that does not allow any UDP packet going through, a UDP packet carrying a network management message may be encapsulated within a hypertext transport protocol (HTTP), referred to herein as UDP over HTTP (UDP/HTTP). Since most of the firewalls allow Internet traffic using HTTP protocol with a transport control protocol (TCP) port of 80, it is likely a UDP packet embedded within an HTTP packet having a destination TCP port of 80 or port 443 can reach management server 1001. In such a configuration, when management server 1001 receives the HTTP packet, it may remove any HTTP header to reveal a UDP packet encapsulated therein. Thereafter, an IP packet encapsulated within the UDP packet may be extracted and the network management message within the IP packet can be obtained.

According to one embodiment, management server 1001 and network access devices associated with an organization such as network access devices 1002 may utilize an internal set of IP addresses (also referred to as mTunnel or management IP addresses) to exchange network management messages via the respective mTunnel or mTunnels. That is, the internal IP addresses used by management server 1001 and network access devices 1002 via the respective mTunnel or mTunnels may be in a separate IP address space (e.g., 6.x.x.x) that is different from an IP address space used between network access devices 1002 and their network client devices 1008 over LAN(s) 1005 (e.g., 10.x.x.x). The internal IP addresses described herein are only used between management server 1001 and network access devices 1002 to exchange network management messages over the respective mTunnel(s). In one embodiment, for a network access device that performs NAT for its LAN devices, it may have at least three IP addresses: 1) an uplink IP address for regular network traffic to an external network (e.g., external IP address used in the external network, or a public IP address if the uplink interface of the network access device is directly coupled to the Internet; 2) a downlink IP address (e.g., a private IP address used between the network access device and its LAN devices); and 3) an internal IP address (e.g., a management IP address or mTunnel IP address) solely used between a management server and the network access device via an mTunnel over the Internet for the purpose of exchanging network management messages. In this example, management server 1001 and network access devices 1002 using the internal IP addresses to exchange network management messages over mTunnel(s) 1021 forms a logical network 1023 (e.g., a logical management network).

Similarly, management server 1001 and network access devices 1003 of another organization in this example may utilize a different set of internal IP addresses to exchange network management messages through the respective mTunnel or mTunnels, where the internal IP addresses may be in a different IP address space than the one of IP addresses used between network access devices 1003 and their client devices 1009. Similarly, in this example, management server 1001 and network access devices 1003 using internal IP addresses to exchange network management messages over mTunnel(s) 1022 forms a logical network 1024 (e.g., a logical management network). The internal IP addresses (referred to herein as a first set of internal IP addresses) used between management server 1001 and network access devices 1002 may be different than the internal IP addresses (referred to herein as a second set of internal IP addresses). The first and second sets of internal IP addresses may be in different IP address spaces or in the same IP address space dependent upon the specific configuration.

According to one embodiment, when a network access device is powered up and initialized, the network access device performs certain self-configuration operations to determine whether the network access device should operate as a gateway or as an access point behind a gateway. In one embodiment, when a network access device boots up, it initializes its Ethernet interface and attempts to request an IP address (e.g., a publicly accessible IP address over the Internet, also referred to as an uplink IP address) by broadcasting its media access control (MAC) address within a dynamic host configuration protocol (DHCP) request via its Ethernet interface. If the Ethernet interface of this network access device is connected to the Internet, a DHCP server, which may be a separate server or part of management server 1001, will respond with a valid IP address assignment, and the network access device will operates as a gateway device. If there is no DHCP response received within a predetermined period of time, the network access device assumes that it is operating behind another gateway device that performs NAT, and the network access device then joins an existing network and operates as an access point.

According to one embodiment, when operating behind a gateway, each of the network access devices derives its own IP address and assigns IP addresses to its client devices using a predetermined method in a consistent manner. In one embodiment, a network access device performs a hash operation on at least a portion of its hardware identifier such as a MAC address to generate an IP address. In a particular embodiment, a network access device hashes its 6-byte MAC address using a predetermined hash function (e.g., CRC-32 hash function) to generate lower three bytes of its IP address. Note that each of the network access devices may generate two IP addresses for itself: 1) an internal IP address in a first IP address space (e.g., 6.x.x.x) solely for communicating network management messages with management server 1001 via an mTunnel; and 2) a private IP address in a second IP address space (e.g., 10.x.x.x) for normal network traffic with its client devices.

Similarly, when a network client device, such as client devices 1008, requests an IP address, the associated network access device hashes a MAC address of the client device to derive an IP address for the client device. Since each of the network access devices performs the same hash operation using the same hash function on a MAC address of a client device, the client device can consistently obtain the same IP address from different network access devices. As result, the client device can roam across different network access devices without having to change its IP address or to perform any address resolution protocol (ARP) related operations.

Figure 8B:
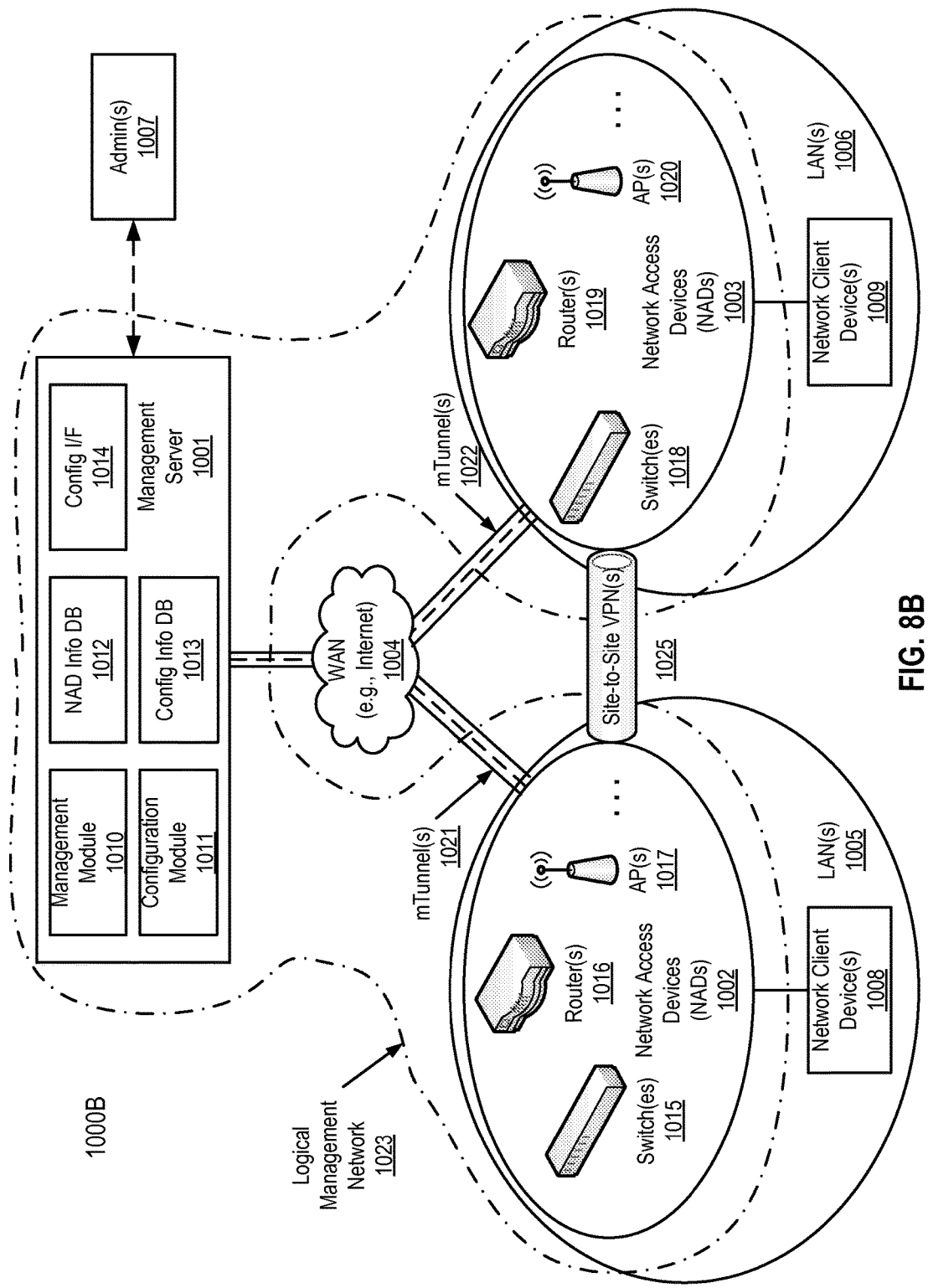

Referring back to FIG. 8A, as described above, network access devices 1002 and network access devices 1003 may be associated with different organizations and managed by management servers 1001. In other configurations, network access devices 1002 and network access devices 1003 may be associated with the same organization as shown as system 1000B in FIG. 8B. Referring to FIG. 8B, in this configurations, network access devices 1002 and network access devices 1003 may be deployed and located at different sites or geographical locations of the organization. According to one embodiment, at least one virtual private network (VPN) tunnel 1025 is maintained between at least one of network access devices 1002 and at least one of network access devices 1003, also referred to as a site-to-site VPN. Some or all of the network access devices can be configured, via configuration interface 1014, to participate in the site-to-site VPN.

Figure 9:
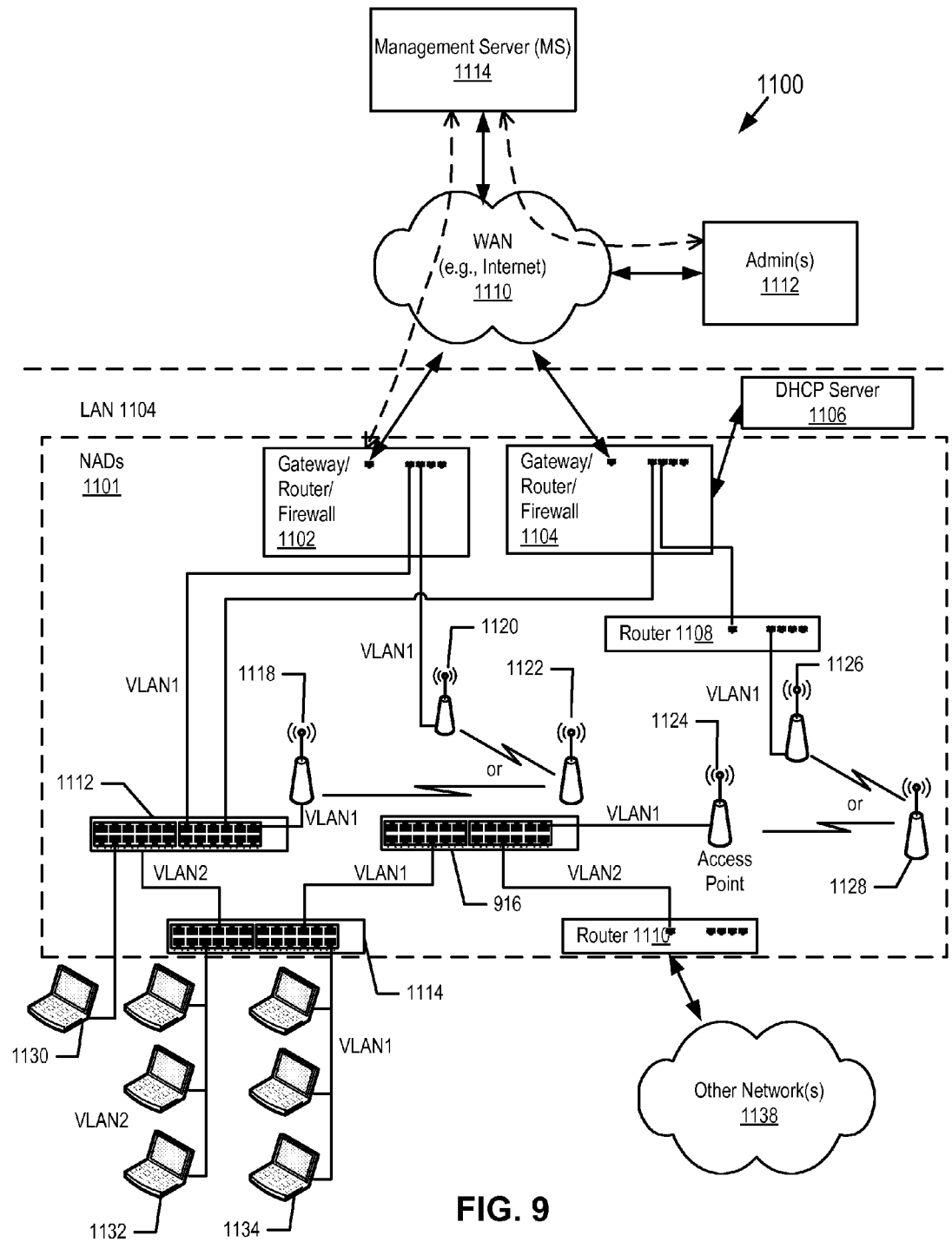
FIG. 9 is a block diagram illustrating a network configuration in accordance with another embodiment of the invention.

FIG. 9 is a block diagram illustrating a network configuration in accordance with an embodiment of the invention. Network configuration 1100 may be implemented as part of network configurations as shown in FIG. 8A and FIG. 8B. The configuration of NADs 1101 represents one possible implementation of one of the LANs 1005 and 1006 of FIG. 8A and FIG. 8B, such as the one including an access network, where one or more of NADs 1101 are in accordance with embodiments of the present invention. That is, any of the routers (e.g., 1102, 1104, 1108 and 1110), network switches (e.g., 1112-1114), and wireless access points (e.g., 1118-1128) shown in FIG. 9 may be implemented by way of the previously described network access devices, including NADs 1002 and 1003 of FIG. 8A and FIG. 8B. FIG. 9 illustrates the complexity and variety of possible configurations that may need to be accounted for by a system administrator (e.g., admin 1112) when configuring a network access device within LAN 1104. For example, LAN 1104 includes multiple gateways to WAN 1110, multiple VLANs, and multiple possible paths to WAN 1110 by many of the NADs 1101. A change in one of the NADs 1101 may require complex configuration changes to one or more of the downstream NADs. To be sure, a configuration change or fault in wireless access point 1120 may result in required configuration changes to wireless access points 1122 and 1118, and network switches 1112 and 1114. Similarly, a configuration change or fault in router 1108 may result in required configuration changes to wireless access points 1126, 1128, and 1124, network switches 1116 and 1114, and router 1110. As is apparent, manual configuration of the network access devices in a network such as LAN 1104 can be complex and extremely error prone. Furthermore, changes to LAN 1104 resulting is a loss of network connectivity may be difficult to diagnose and troubleshoot. Accordingly, embodiments of the present invention disclose allow for an installer to install one or more of NADs 1101 by simply powering on the device and connecting a cable. Then, the NAD may automatically establish a connection to WAN 1110, such that Administrator 1112 may remotely configure NAD 1102 by way of management server 1114. Furthermore, NADs 1101 may be configured to periodically test their connection to WAN 1110 and if it is lost, to automatically establish a new connection to WAN 1110, so as to reduce down time of LAN 1104.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A system, comprising:
a management server comprising a processor and a memory, configured to manage a plurality of network access devices by:
transmitting a bytecode to at least a portion of the network access devices, the bytecode representing one or more packet captures (PCAPs) filtering rules; and
generating merged PCAPs based on PCAPs captured by at least the portion of the plurality of network devices based on the bytecode;
wherein a PCAP stream received from network access device of the plurality of network access devices includes a PCAP header and a plurality of PCAP packets as a payload of the PCAP stream; and
wherein the PCAP header includes a first timestamp indicating time when a PCAP process of the network access device started.

2. The system of claim 1, wherein the management server is configured to transmit the bytecode to at least the portion of the plurality of network access devices without requiring the portion of the plurality of network access devices to compile the PCAPs filtering rules.

3. The system of claim 1, wherein the management server includes a web interface configured to provide a set of network management tools for configuring the plurality of network access devices over the Internet, and
wherein the management server is configured to transmit the bytecode based on a filtering expression received via the web interface that specifies how the PCAPs are to be captured.

4. The system of claim 1, wherein the management server maintains a persistent hypertext transport protocol (HTTP) connection with each of the plurality of network access devices.

5. The system of claim 4, wherein each of the plurality of network access devices includes an HTTP server component running therein that communicates with an HTTP client component running within the management server to maintain the HTTP connection.

6. The system of claim 5, wherein the management server is configured to stream the PCAPs a over the Internet via the HTTP connections between the management server and at least the portion of the plurality of network access devices.

7. The system of claim 6, wherein the management server is configured to stream the PCAPs from the HTTP server components of the portion of the plurality of network access devices to the HTTP client component using an HTTP streaming protocol in which the PCAPs are transported in a plurality of HTTP chunks.

8. A method, comprising:
transmitting, by the management server, a bytecode to at least a portion of a plurality of network access devices, the bytecode representing one or more packet capture (PCAPs) filtering rules; and
generating merged PCAPs based on PCAPs captured by at least the portion of the plurality of network devices based on the bytecode;
wherein a PCAP stream received from network access device of the plurality of network access devices includes a PCAP header and a plurality of PCAP packets as a payload of the PCAP stream; and
wherein the PCAP header includes a first timestamp indicating time when a PCAP process of the network access device started.

9. The method of claim 8, wherein transmitting the bytecode to at least the portion of the network access devices is performed without requiring the portion of the plurality of network access devices to compile the PCAPs filtering rules.

10. The method of claim 8, further comprising:
providing a set of network management tools on a web interface for configuring the plurality of network access devices over the Internet, wherein the transmitting transmits the bytecode based on a filtering expression received via the web interface to specify how the PCAPs are to be captured.

11. The method of claim 8, wherein each of the plurality of network access devices includes an HTTP server component running therein that communicates with an HTTP client component running within the management server to maintain the HTTP connection.

12. The method of claim 11, further comprising:
streaming the PCAPs from the HTTP server component of each of the portion of the plurality of network access devices to the HTTP client component using an HTTP streaming protocol in which the PCAPs are transported in a plurality of HTTP chunks.

13. A non-transitory machine-readable medium having instructions stored therein, which when executed by one or more processors of a management server, cause the one or more processors to:
transmit a bytecode to at least a portion of a plurality of network access devices, the bytecode representing one or more packet capture (PCAPs) filtering rules; and
generate merged PCAPs based on PCAPs captured by at least the portion of the plurality of network devices based on the bytecode;
wherein a PCAP stream received from network access device of the plurality of network access devices includes a PCAP header and a plurality of PCAP packets as a payload of the PCAP stream; and
wherein the PCAP header includes a first timestamp indicating time when a PCAP process of the network access device started.

14. The non-transitory machine-readable medium of claim 13, wherein the execution of the instructions by the one or more processors causes the processor to transmit the bytecode to at least the portion of the network access devices without requiring the network access devices to compile the PCAPs filtering rules.

15. The non-transitory machine-readable medium of claim 13, wherein the execution of the instructions by the one or more processors causes the processor to,
provide a set of network management tools, via a web interface, for configuring the plurality of network access devices over the Internet,
transmit the bytecode based on a filtering expression received from the web interface that specifies how the PCAPs are to be captured.

16. The non-transitory machine-readable medium of claim 13, wherein each of the network access devices includes an HTTP server component running therein that communicates with an HTTP client component running within the management server to maintain the HTTP connection.

17. The non-transitory machine-readable medium of claim 16, wherein the execution of the instructions by the one or more processors causes the processor to stream the PCAPs from the HTTP server components of each of the portion of the plurality of network access devices to the HTTP client component using an HTTP streaming protocol in which the PCAPs are transported in a plurality of HTTP chunks.

* * * * *